United States Patent
Gaylord

[11] 3,964,138
[45] June 22, 1976

[54] LOCKING MEANS FOR RELEASABLE STRAP CONNECTORS

[76] Inventor: Jack A. Gaylord, 12578 Nacido Drive, San Diego, Calif. 92128

[22] Filed: Sept. 29, 1975

[21] Appl. No.: 617,325

[52] U.S. Cl. .............................................. 24/230 A
[51] Int. Cl.² ........................................ A44B 19/00
[58] Field of Search ............. 24/75, 230 A, 230 AP, 24/230 AS, 230 AV, 230 LP

[56] References Cited
UNITED STATES PATENTS

| | | |
|---|---|---|
| 2,459,223 | 1/1949 | Henderson .............. 24/230 AV UX |
| 3,183,568 | 5/1965 | Gaylord ............................. 24/230 A |
| 3,330,014 | 7/1967 | Gaylord ............................. 24/230 A |
| 3,541,650 | 11/1970 | Gaylord ............................. 24/230 A |
| 3,541,651 | 11/1970 | Gaylord ............................. 24/230 A |
| 3,659,322 | 5/1972 | Gaylord ............................. 24/230 A |
| 3,744,103 | 7/1973 | Gaylord ............................. 24/230 A |

*Primary Examiner*—Donald A. Griffin
*Attorney, Agent, or Firm*—George B. White

[57] ABSTRACT

In a releasable strap connector wherein the male connecting member has at least one prong insertable into a socket in the female connecting member, which socket is intersected by a transverse rocking bar, the latter being cut away at the intersection so as to leave the socket unobstructed for the insertion of the prong and being resiliently urged into an obstructing position into engagement with a pocket in the prong to hold the prong connected, and a lever being employed for rocking the bar from an obstructing to a non-obstructing position for the release of the prong; the improvement of lever locking device for locking the bar against accidental oscillation which includes a pair of hollow legs of said lever telescoping on registering arms of the rocking bar and springs in the hollow legs urging the legs and the locking lever upwardly away from said bar; the connecting top of the locking lever has a pin extending laterally from each side thereof, each pin riding in an adjacent guide in the frame of the female member, each guide including a first arcuate groove having a locking end and a releasing end and being concentric with the axis of the rocking bar, a second arcuate groove spaced from the locking end of the first groove and being concentric therewith, and a radial connecting groove between the locking end of the first groove and the middle of the second groove so as to form said second groove into a pair of opposite locking pockets for said pin, and a radial outward pocket at the releasing end of said first groove to be engaged by said pin in the releasing position of the lever.

21 Claims, 6 Drawing Figures

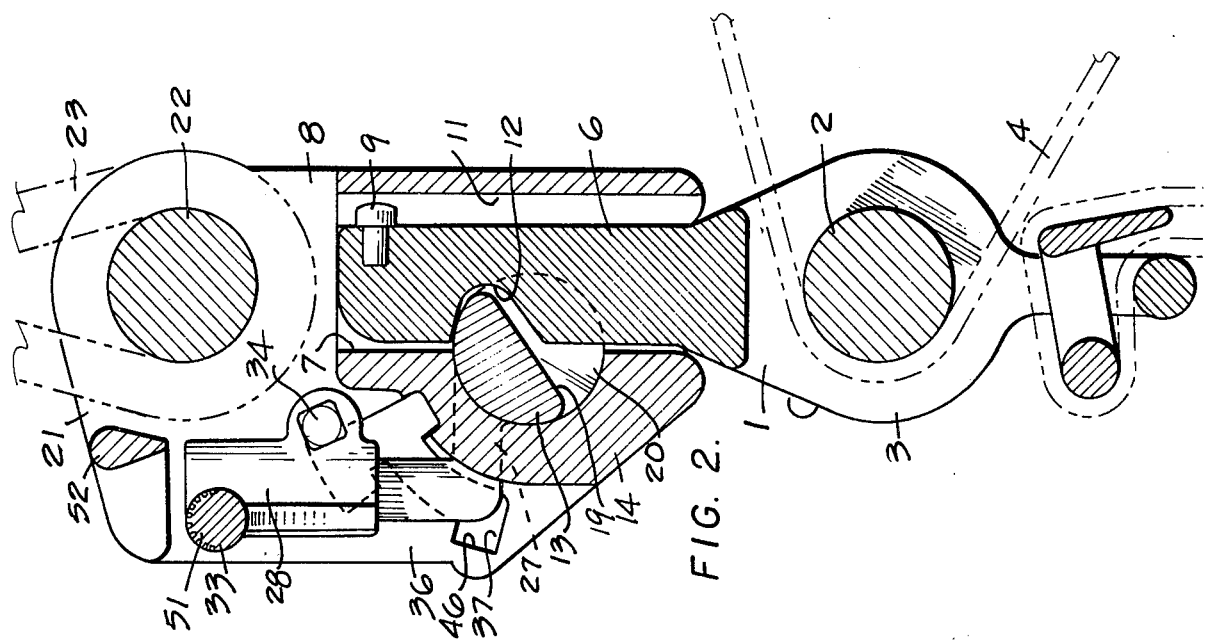
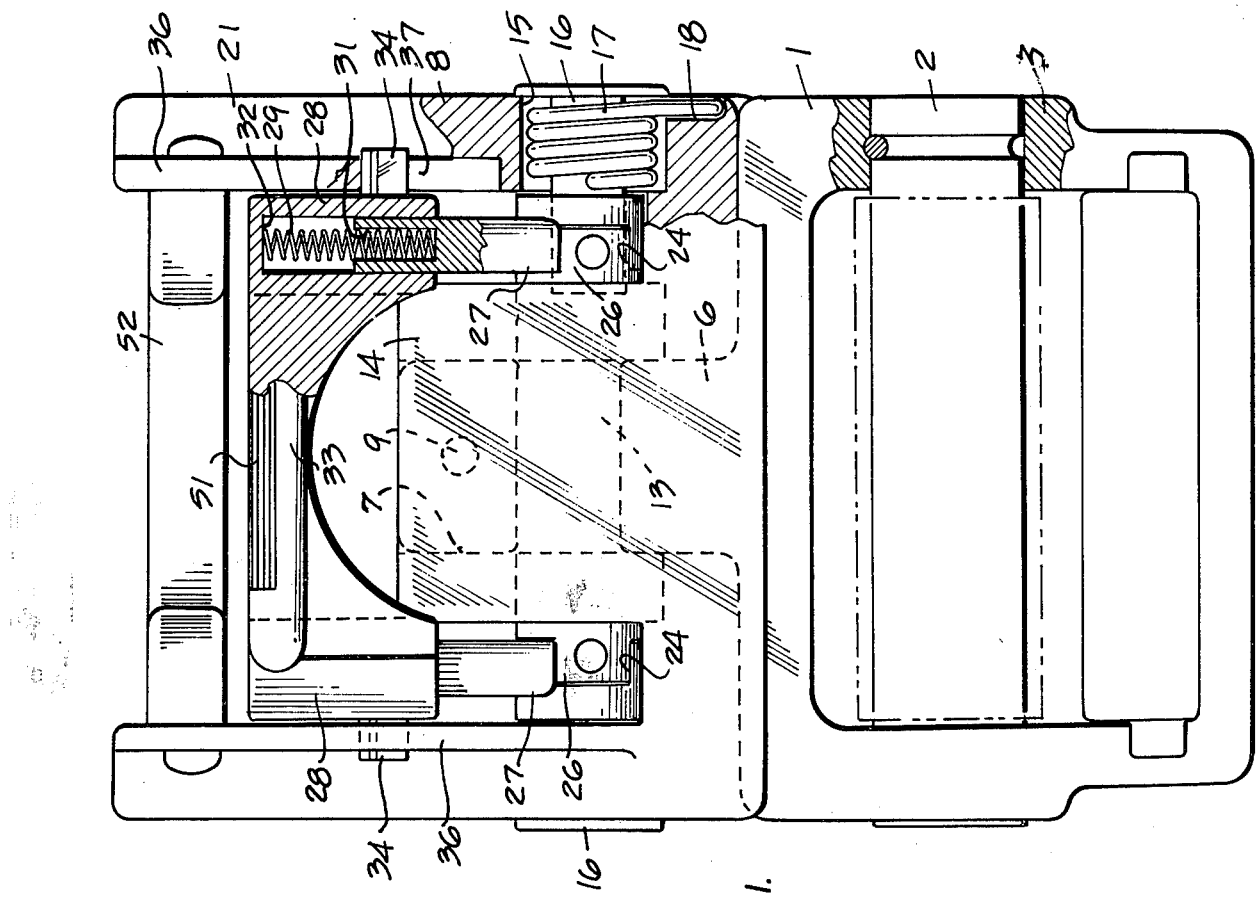

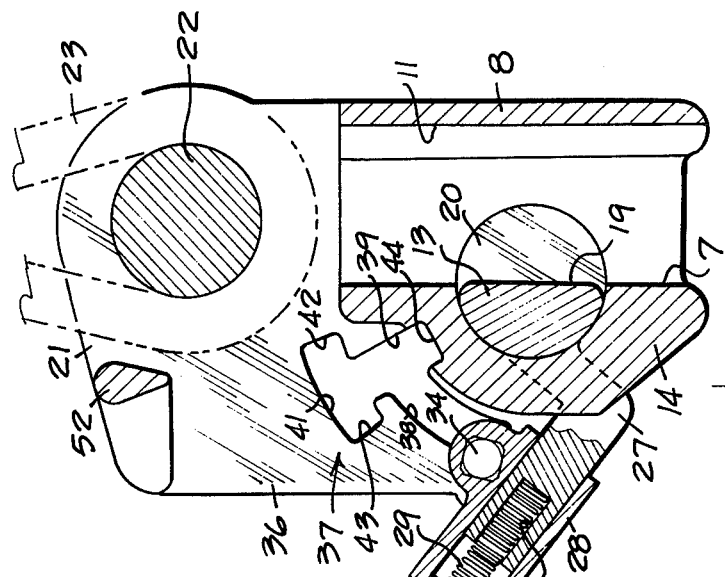
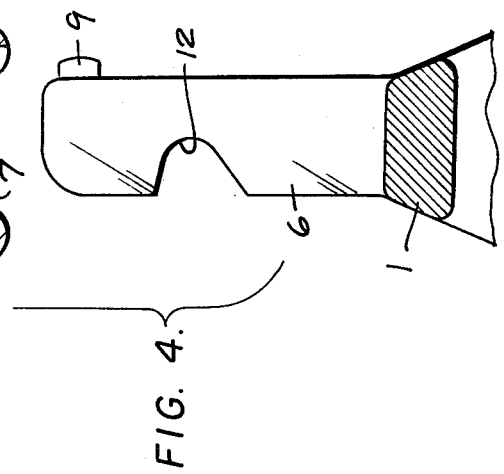
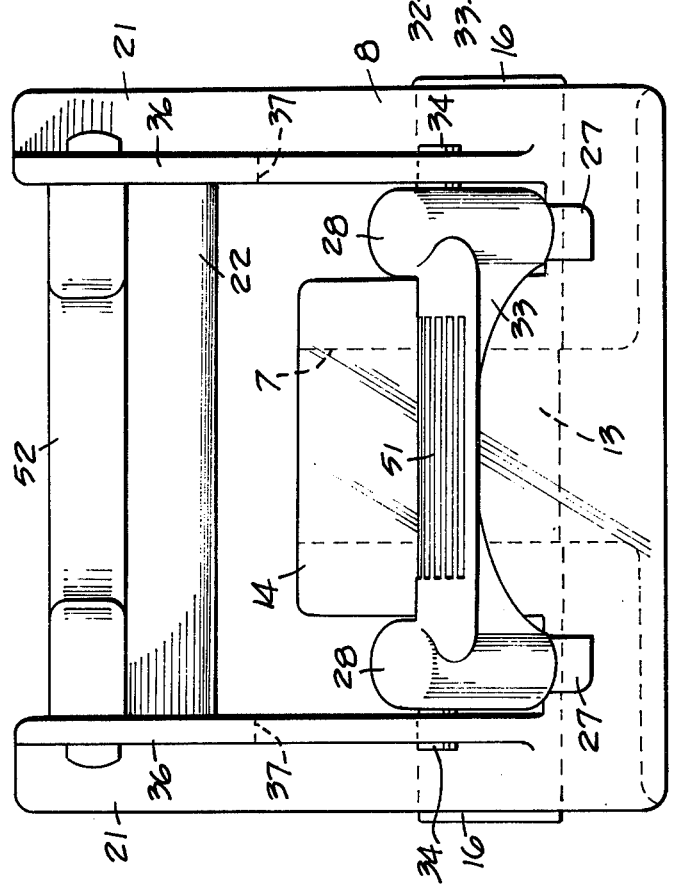
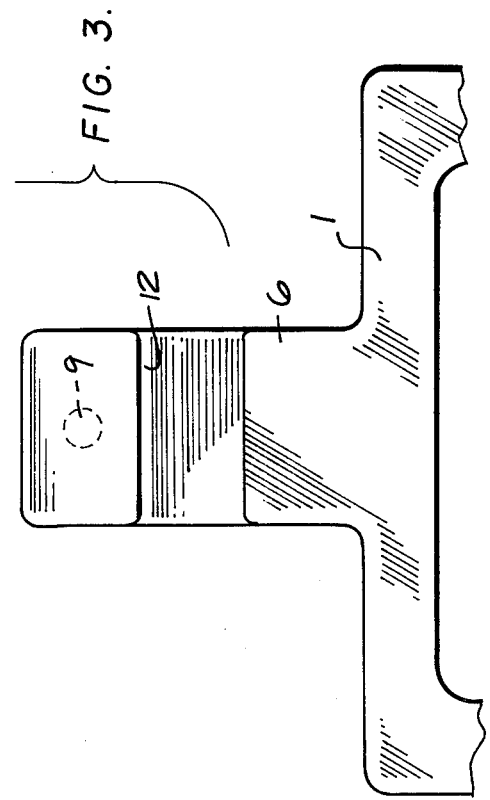
FIG. 3.
FIG. 4.

LOCKING MEANS FOR RELEASABLE STRAP CONNECTORS

BACKGROUND OF THE INVENTION

In releasable strap connectors of the type shown in Pat. Nos. 3,183,568, 3,330,014, 3,541,651, 3,541,650, 3,659,322 and 3,744,103 each granted to John A. Gaylord, the safety device for the operating bar or shaft is a safety lever which prevents the pulling of the hand lever for turning of the oscillating bar into unobstructing position for releasing the prong of the male member. The previous structures were reasonably safe to resist vibration and other stresses to which such strap connectors are subjected, but when used for the straps of a canopy or parachute, the present forcible method of ejection of the personnel from an airplane creates a sudden momentary shock which, when exerting a sudden force to pull the risers of the parachute taut, could release the locking lever and thereby drop the person from his parachute and cause a fatal accident.

The primary feature of this invention is the positive locking of the locking lever into a groove which has locking pockets both in the locking and releasing positions and provision is made even for a sudden momentary shock, whereby the locking pins riding in said groove will not travel from locking to the releasing position accidentally under even the most sudden of stresses, and prevent fatal accidents.

DESCRIPTION OF FIGURES

FIG. 1 is a front view of the strap connector, partly in section.

FIG. 2 is a side view of the strap connector, partly in section.

FIG. 3 is a front view showing the strap connector members released.

FIG. 4 is a side view, partly in section showing the strap connector member released.

DETAILED DESCRIPTION

Figure 5:
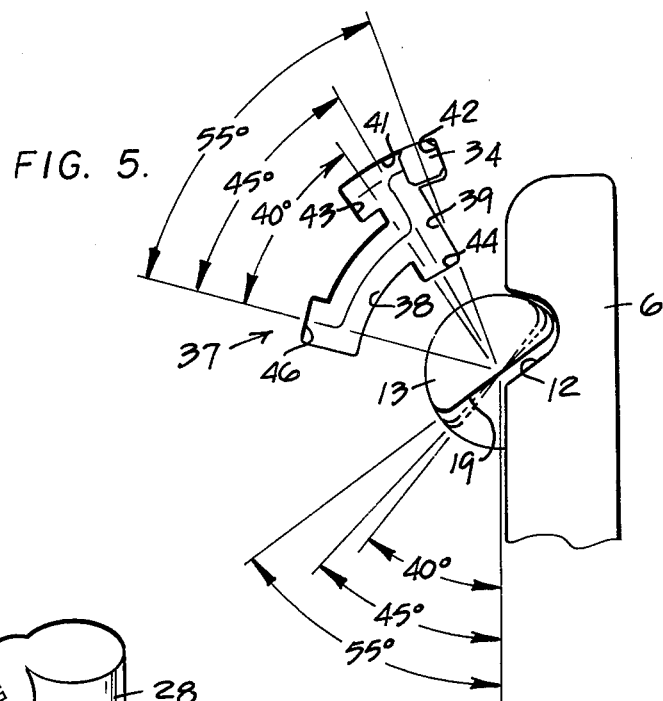
FIG. 5 is a diagrammatic representation of the positional relationship of the rocking bar and the projector's pins in the guiding grooves.
Figure 6:
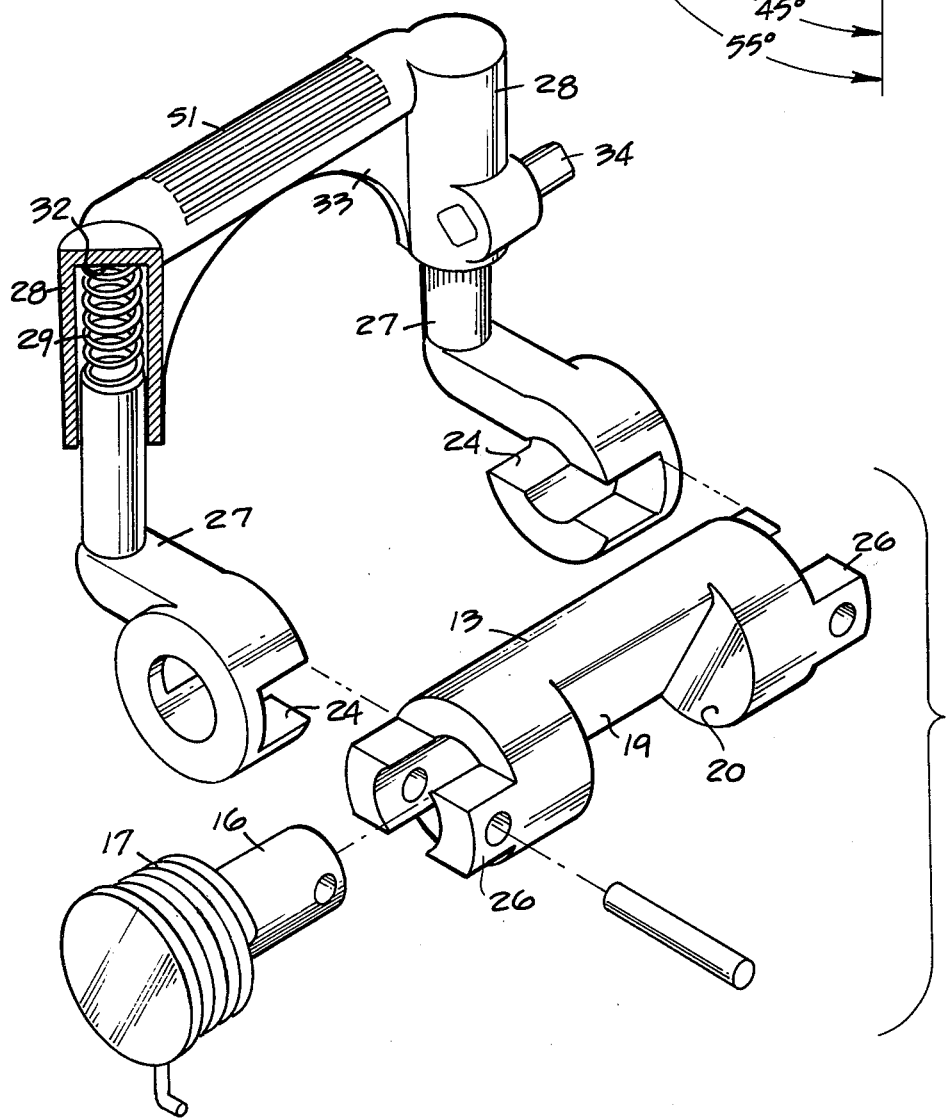
FIG. 6 is a developed view, partly in section, of the manipulating hand lever and its connection to the rocking bar.

In modern aircraft when the person is ejected from the craft the seats come out with a high charge, and the rocker risers are loose and the canopy release is flat. Then as the rocket picks up the risers it pulls the person out of the seat and the canopy release is thrown back and rocks back and forth creating considerable shock and bouncing of the strap connectors to the riser. It is vital that separation of the strap connections under such conditions be positively prevented.

The strap connectors herein include a male connector member 1 provided with a webbing bar 2 in its frame 2 to be connected to a webbing or strap 4. A prong 6 on the male member 1 extends into a socket 7 in the female connector member 8. A guide pin 9 extends from the prong 6 and rides in a guide groove 11 so as to positively locate the prong 6. The prong 6 has a pocket 12 on one side thereof facing oppositely to the guide pin 9 and toward a rocking bar 13. The rocking bar 13 extends traversely in the body 14 of the female member 8 and intersects the socket 7 and the pocket 12. A keeper 16 in a bearing hole 15 of the female member 8 is fixed to each end of the rocking bar 13.

A coil spring 17 has one end anchored in the keeper 16 and the other end in recess 18 and is so biased as to urge the rocking bar 13 into a position where a diametrical shoulder 19 adjacent a cutaway portion 20 of the rocking bar 13 is in engagement with the pocket 12 of the prong 6, as shown in FIG. 2 and in FIG. 5.

The female body 14 has a top frame 21 in which is a pin 22 for engagement by a riser strap 23 of the parachute. On the hub of each lever arm 27 are spaced slots 24 and tongues 26 on each end of the rocking bar 13 interlock with the respective slots 24. Each lever arm 27 is bent substantially parallel with the socket 7 and is spaced outwardly therefrom. A tubular lever leg 28 telescopes over the end of each lever arm 27. A coil spring 29 in a pocket 31 in the top of the lever arm 27 bears against the inside end 32 of the tubular lever leg 28 so as to normally urge the leg 28 away from the lever arm 27. The lever legs 28 are connected to one another by a handle 33 so as to form a substantially U-shaped handle lever. From each leg 28 projects outwardly a tracking pin 34.

The female body 14 has spaced parallel flanges 36 along the outside of the lever legs 28 and each flange 36 has therein a guiding slot 37 to receive and guide the adjacent tracking pin 34 therein. Each guiding slot 37 has an arcuate middle slot 38, the arc of which is concentric with the axis of the rocking bar 13. At the locking end of the middle slot 38 is a radial outward slot 39 which is radial to the axis of the rocking bar 13. The radial slot 39 extends into the middle of an arcuate locking slot 41 concentric with the middle slot 38, whereby the arcuate locking slot 41 is divided into a pair of spaced locking sockets 42 and 43 into which fits the tracking pin 34 in the locked positions of the rocking bar 13. On the lower end of the radial slot 39 nearer the rocking bar 13 is a middle pocket 44. At the releasing end of the arcuate middle slot 38 is an outward radial pocket 46 which is to engage and hold the tracking pin 34 in the unlocking or releasing position of the rocking bar 13. The tracking pin 34 is preferably or rectangular cross-section with the corners rounded.

In the releasing position the rocking bar 13 is turned to withdraw from the pocket 12 of the prong 6 so that the cutaway diametrical shoulder 19 thereof is in a perpendicular position parallel with the prong 6 as shown in FIG. 4. For engagement with the pocket 12 in the prong 6 the locking bar 13 is turned about 45° clockwise from the position shown in FIG. 4 into the position shown in FIG. 5, and the tracking pin 34 is moved thereby correspondingly in the arcuate middle slot 38 to the radial slot 39 so that it is urged upwardly into the arcuate locking slot 41 and then moved another 10°, a total of about 55° so as to turn the bar shoulder 19 into the pocket 12 and thereby to lock the male prong 6 into the female socket 7.

On the top handle 33 is a finger engaging bar 51 to facilitate the manipulation of the handle together with the telescoping legs and the lever arms. A guard 52 on the female member above the handle 33 projects over the finger engaging bar 51 to prevent accidental pressure on the handle 33.

In operation the male prong 6 can be disengaged from the female pocket 7 by moving the handle 33 about 10 degrees to withdraw the tracking pins 34 from the locking pocket 42 and to the radial slot 39. Then by exerting pressure on the finger engaging bar 52 and on the handle 33 the telescoping legs 28 on the lever arms 27 are depressed to register the racking pins 34 with the middle slot 38, and then the handle 33 is moved forward another 45 degrees so as to register the tracking pins 34 with the releasing pockets 46. Then the handle 33 is released so that the tracking pins 34 are urged outward into the radial releasing pockets 46 and are locked therein in disconnecting releasing position.

As illustrated particularly in FIG. 5 the shoulder 19 of the cutaway portion in the releasing position of the rocking bar 13 is parallel with the pocket 7, and then it is turned in clockwise direction viewing FIG. 5 about 45 degrees from the perpendicular to where the tracking pins 34 are in registry with the radial slots 39 and then as the handle 33 is released the springs 29 move the legs 28 and the handle 33 outwardly so that the tracking pins 34 are in the locking slots 41, and then the handle 33 is moved an additional 10° to move the tracking pins 34 into the locking pockets 42, whereby the rocking bar 13 is turned altogether 55° from the releasing to the locking position. Inasmuch as the middle slots 38 and the locking slots 41 are concentric to the axis of the rocking bar 13, the rocking bar 13 moves to the same degrees as the tracking pins 34 in the slots.

The shock exerted on the connection is tremendous for reasons heretofore stated but are only momentary and a shock from back or front may move the tracking pins 34 from the 55° locking pockets 42 to the 40° pockets 43 wherein the handle 33 would be still locked against any further turning and then when relieved from the back and forth shock it would snap back into the 55° locking pockets 42. A multiple shock, although momentary, may move the tracking pins out of the 55° locking pockets 42 to the center or radial slot or track 39 which is the 45° position but the springs 29 would prevent disengagement unless the handle 33 is depressed and should the force momentarily overcome the springs 29, the tracking pins 34 would be caught in the lower pockets 44 in the 45° position, and upon release of the force on the springs 29, the handle 33 would be snapped outward and would remain in locking position. The reason that the tracking pins 34 are returned to the locked position is that after each shock, both the rocking bar 13 and the handle 33 are spring loaded toward the locked position. In case of multiple shock the movement of the locking bar 13 altogether does not exceed 15° from the locked position of 55° to 45° and possibly 40° respectively and such movement is limited within the range of rocking of the rocking bar 13 permissible within the pocket 12 without releasing the prong 6. When the tracking pins 34 are in the releasing pockets 46 holding the bar in releasing position, the connectors may be interlocked by inserting the prong 6 in the socket 7 and by depressing the handle 33 sufficiently to free the tracking pins 34 from the releasing pockets 46, the spring action on the respective parts then returns the tracking pins 34 into locking position with very slight pressure and movement. The radius of each middle slot 38 is equal to the distance of the tracking pin 34 from the axis of the rocking bar 13 when the springs expand and push the handle 33 out from the compressed position.

I claim:

1. In a releasable strap connector, a female member having a socket therein, and a male member having at least one prong fitting into said socket, said prong having a pocket therein, a rocking bar journalled in said female member intersecting said socket, means to position said prong so that said pocket faces said rocking bar at the intersection thereof, a portion of said rocking bar at the intersection being cutaway so as to leave said socket and said pocket unobstructed in one position of said rocking bar thereby to permit insertion and withdrawal of said prong, and in another position to project into said pocket thereby to interlock with said prong, and means for turning said rocking bar from interlocking position to unobstructing position at will, the improvement of manipulatable means for rocking said rocking bar into and out of the interlocking position and means for locking said rocking bar, comprising a handle lever connected to the rocking bar for rocking the same, coacting guide elements between said female member and said handle lever guiding said handle lever between locking and releasing positions, locking means related to said coacting guide elements to lock said handle lever in interlocking position, and resilient means to urge said coacting elements toward locking position.

2. The releasable strap connector specified in claim 1, and a telescoping member on said handle lever substantially radial relatively to said rocking bar, said resilient means including a spring biased for turning said rocking bar to said interlocking position, and for urging said telescoping members relatively to said coacting guide elements toward said locking position.

3. The releasable strap connector specified in claim 1, and said coacting guide elements including at least one projection extending from said handle lever, a guide on said female member engageable by said projection, said locking means being spaced parts of said guide offset at an angle to hold said projection against movement relatively to said guide, and said resilient means being biased to urge said projection into engagement with said spaced parts.

4. The releasable strap connector specified in claim 1, and said coacting guide elements including at least one projection extended laterally from said handle lever, a guiding path on said female member in which said projection is moved, said locking means being locking pockets formed in said guiding path at angles corresponding to the interlocking position of said rocking bar, and said resilient means being on said handle lever and urging said handle lever toward a position to interlock said projection with said locking pockets.

5. The releasable strap connector specified in claim 4, and said coacting means including a lateral projection from said handle lever, a recessed guiding path on said female member adjacent said handle lever in which said projection is movably confined, a first arcuate portion of said path being concentric with said rocking bar, a second arcuate portion being concentric with and being spaced outwardly from the first arcuate portion with respect to said rocking bar, a connecting portion extending from said first arcuate portion to the second arcuate portion between the ends of the latter whereby the opposite ends of said second arcuate portion being formed into spaced locking pockets for confining said projection in either of spaced locking positions.

6. The releasable strap connector, specified in claim 5, and the length of said second arcuate portion being less than the arc of rocking required to withdraw said rocking bar from said prong pocket thereby to permit limited rocking of said handle lever under momentary shocks without releasing said prong from said socket.

7. The releasable strap connector specified in claim 6, and a pocket formed in said first arcuate portion spaced from said connecting portion to confine said projection when said handle lever withdrew said projection from said section arcuate portion and rocked said rocking bar into prong releasing position.

8. The releasable strap connector specified in claim 6, and a middle pocket formed in said first arcuate portion of said connecting portion to confine said projection in radial displacement relatively to said rocking bar.

9. The releasable strap connector specified in claim 1, and said handle lever including,
a handle,
at least one telescopic leg extended from the handle,
and means to connect the leg to said rocking bar whereby said rocking bar is rocked by manipulating said handle,
and said resilient means including spring means urging said telescopic leg away from said connecting means so as to urge said handle away from said rocking bar.

10. The releasable strap connector specified in claim 9, and said coacting guide elements being
tracking projection means extended laterally from said handle,
a recessed guide confining said tracking projection means,
said recessed guide including
a first arcuate portion of a length between a locking end and a releasing end guiding said tracking projection means throughout its path during the movement of the handle when turning said rocking bar from interlocking position to prong releasing position,
a second arcuate portion at the locking end of and spaced radially outwardly from said first arcuate portion being of a length to limit the movement of said tracking projection means therein corresponding to the turning of said rocking bar only within the range of the interlocking position of the rocking bar,
and a connecting portion from said first arcuate portion to between the ends of said second arcuate portion,
said arcuate portions being substantially concentric with the axis of rocking of said rocking bar.

11. The releasable strap connector specified in claim 10, and said connecting portion being substantially radial with respect to said arcuate portions.

12. The releasable strap connector specified in claim 11, and a releasing pocket extending radially outward from the releasing end of said first arcuate portion for confining said tracking projection means in the releasing position of said rocking bar.

13. The releasable strap connector specified in claim 12, and a locking pocket extending radially toward the rocking bar from the locking end of said first arcuate portion to confine said tracking projection means in locking position when thrown radially toward said rocking bar by momentary shock compressing said spring.

14. The releasable strap connector specified in claim 11, and said cutaway portion of said bar being at such angle to require a turn of the bar of about 55° from fully interlocking position to fully releasing position, and to permit a turning of the bar at about 10° within the range of its interlocking position,
and said first arcuate portion confining said tracking projection means throughout 55° between the locking end and the releasing end,
and said second arcuate portion confining said tracking projection means over a path limited to 10°,
and said connecting portion being radial at an angle corresponding to about the 45° locking position of said rocking bar.

15. The releasable strap connector specified in claim 14, and said handle lever including,
a handle,
a pair of spaced hollow legs extended from said handle,
a pair of arms connected to said rocking bar and being spaced to telescope into said hollow legs,
said resilient means being a coil spring nested in each rocking arm and extending into the adjacent leg so as to urge said leg and the handle away from said rocking bar.

16. The releasable strap connector specified in claim 9, and a guard on the female member above said handle to prevent accidental depressing of said handle.

17. The releasable strap connector specified in claim 9, and spring means anchored in said rocking bar and in said female member being biased to urge said rocking bar into interlocking position.

18. The releasable strap connector specified in claim 1, and said handle lever including,
a handle,
a pair of spaced hollow legs extended from said handle,
a pair of arms connected to said rocking bar and being spaced to telescope into said hollow legs,
said resilient means being a coil spring nested in each rocking arm and extending into the adjacent leg so as to urge said leg and the handle away from said rocking bar.

19. The releasable strap connector specified in claim 18, and said coacting guide elements being,
a tracking projection extended laterally outward from each leg,
said female member having guiding recesses therein adjacent each leg guiding the respective projections therein, a first arcuate recess being concentric with the axis of rocking of said rocking bar, and having a locking end corresponding to the position of the projection in the interlocking position of the rocking bar, and a releasing end corresponding to the projection position in the releasing position of the rocking bar, a second arcuate recess being concentric with said first recess and spaced at said locking end radially outward therefrom with respect to said rocking bar, and a radial connecting recess extending from said locking end to said second recess between the ends of the latter, said second recess being of a length to limit the travel of said projection to a degree of rocking within the interlocking range of said rocking bar.

20. The releasable strap connector specified in claim 19, and
   a shoulder formed by said cutaway portion at such an angle relatively to said socket to permit said limited back and forth rocking of said rocking bar within said pocket of the prong.

21. The releasable strap connector specified in claim 1, and
   said means to position said prong in said pocket including,
   a positioning element projecting from said prong, and said socket having a guide to confine the positioning element to locate said prong pocket in registry with said cutaway portion of the rocking bar.

* * * * *